United States Patent
Tantrum et al.

(10) Patent No.: US 7,627,542 B2
(45) Date of Patent: Dec. 1, 2009

(54) GROUP IDENTIFICATION IN LARGE-SCALED NETWORKS VIA HIERARCHICAL CLUSTERING THROUGH REFRACTION OVER EDGES OF NETWORKS

(75) Inventors: Jeremy Tantrum, Shoreline, WA (US); Heng Zhang, Bellevue, WA (US); Teresa B. Mah, Bellevue, WA (US); Benyu Zhang, Beijing (CN); Abhinai Srivastava, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 11/534,616

(22) Filed: Sep. 22, 2006

(65) Prior Publication Data

US 2008/0126523 A1    May 29, 2008

(51) Int. Cl.
*G06F 15/18* (2006.01)
*G06E 1/00* (2006.01)
*G06G 7/00* (2006.01)

(52) U.S. Cl. ...................................................... 706/20
(58) Field of Classification Search ................ 706/20
See application file for complete search history.

(56) References Cited

U.S. PATENT DOCUMENTS

| | | | | |
|---|---|---|---|---|
| 7,433,857 | B2 * | 10/2008 | Rice et al. | 706/47 |
| 2004/0249809 | A1 * | 12/2004 | Ramani et al. | 707/4 |
| 2006/0015588 | A1 * | 1/2006 | Achlioptas et al. | 709/220 |
| 2006/0112082 | A1 * | 5/2006 | Platt et al. | 707/3 |
| 2007/0150498 | A1 * | 6/2007 | Li et al. | 707/101 |
| 2007/0192106 | A1 * | 8/2007 | Zilca | 704/270 |
| 2008/0275899 | A1 * | 11/2008 | Baluja et al. | 707/102 |
| 2009/0164475 | A1 * | 6/2009 | Pottenger | 707/10 |
| 2009/0216799 | A1 * | 8/2009 | Manjrekar et al. | 707/103 Y |

OTHER PUBLICATIONS

Tantrum, J., Murua, A., and Stuetzle, W. "Hierarchical Model-Based Clustering of Large Datasets Through Fractionation and Refractionation", SIGKDD'02, pp. 183-190.*
Newman, M. "Detecting community structure in networks", Eur. Phys. J. B 38, 2004, pp. 321-330.*
Ertoz, L, Steinbach, M. and Kumar, V. "Finding Clusters of Different Sizes, Shapes, and Densities in Noisy, High Dimensional Data" SIAM SDM03, pp. 47-58.*
Karypis et al. "Parallel Multilevel k-way Partitioning Scheme for Irregular Graphs", IEEE, 1996.*
Zhang, et al. "BIRCH: An Efficient Data Clustering Method for Very Large Databases", SIGMOD, 1996, pp. 103114.*
Ertoz et al. "Finding Clusters of Different Sizes, Shapes, and Densities in Noisy, High Dimensional Data", SIAM , 2003, pp. 47-58.*

(Continued)

*Primary Examiner*—David R Vincent
*Assistant Examiner*—Li-Wu Chang
(74) *Attorney, Agent, or Firm*—Shook, Hardy & Bacon, LLP

(57) ABSTRACT

A method and system are provided for identifying groups in large-scale networks. The large-scale networks include a collection of nodes and edges that may represent relationships between entities or individuals. The large-scale network is split into a number of fractions satisfying an edge threshold. In turn, the nodes in each fraction are merged to generate one or more clusters based on a specified similarity metric. The large-scale network is recursively split and clustered until distinct groups are identified.

20 Claims, 4 Drawing Sheets

OTHER PUBLICATIONS

Guha et al. "CURE: An Efficient Clustering Algorithm for Large Databases", SIGMOD, 1998, pp. 73-84.*

Minder Chen et al., "Providing Web Services to Mobile Users: The Architecture Design of an M-Service Portal," International Journal of Mobile Communications, vol. 3, No. 1, 2005, pp. 1-18.

Pär LanDor, "Understanding the Foundation of Mobile Content Quality—A Presentation of a New Research Field," Proceedings of the 36th Annual Hawaii International Conference on System Sciences (HICSS'03), Jan. 6-9, 2003, Big Island, Hawaii.

* cited by examiner

GROUP IDENTIFICATION IN LARGE-SCALED NETWORKS VIA HIERARCHICAL CLUSTERING THROUGH REFRACTION OVER EDGES OF NETWORKS

BACKGROUND

Conventionally, clustering techniques perform statistical analysis on data points to create subsets of data points that share common characteristics. The clustering techniques may be utilized by storage devices to organize and store data points. The clustering techniques include hierarchical and partitional clustering. Hierarchical clustering finds successive subsets using previously established subsets, whereas partitional clustering determines all subsets at once. Typically, most clustering techniques are applied to data points and the computation costs associated with the clustering techniques are at least quadratic in the order.

On the other hand, conventional graph partitioning techniques are applied to connected edges and nodes. The graph partitioning techniques do not define subsets that share common characteristics. Rather, graph-partitioning techniques partition graphs into equal partitions while minimizing the number of nodes that are in different partitions.

Generally, conventional clustering techniques and graph partitioning techniques attempt to solve very different problems and operate on data that is formatted differently. Conventional clustering and graph-partitioning techniques fail to provide an integrated solution that partitions large-scale networks and clusters the large-scale networks.

SUMMARY

Embodiments of the present invention identify groups across large-scale networks having edges and nodes. The large-scale networks are split into a collection fractions based on a threshold number of edges associated with the collection of fractions. Clusters are generated from each fraction by utilizing a similarity metric that measures a number of neighbors that two or more nodes share to merge nodes that satisfy the similarity metric. The clusters are iteratively fractioned and new clusters are formed from the previous iteration of clusters. The final iteration produces a set of clusters representing groups that share one or more characteristics when merges are no longer possible among nodes or clusters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
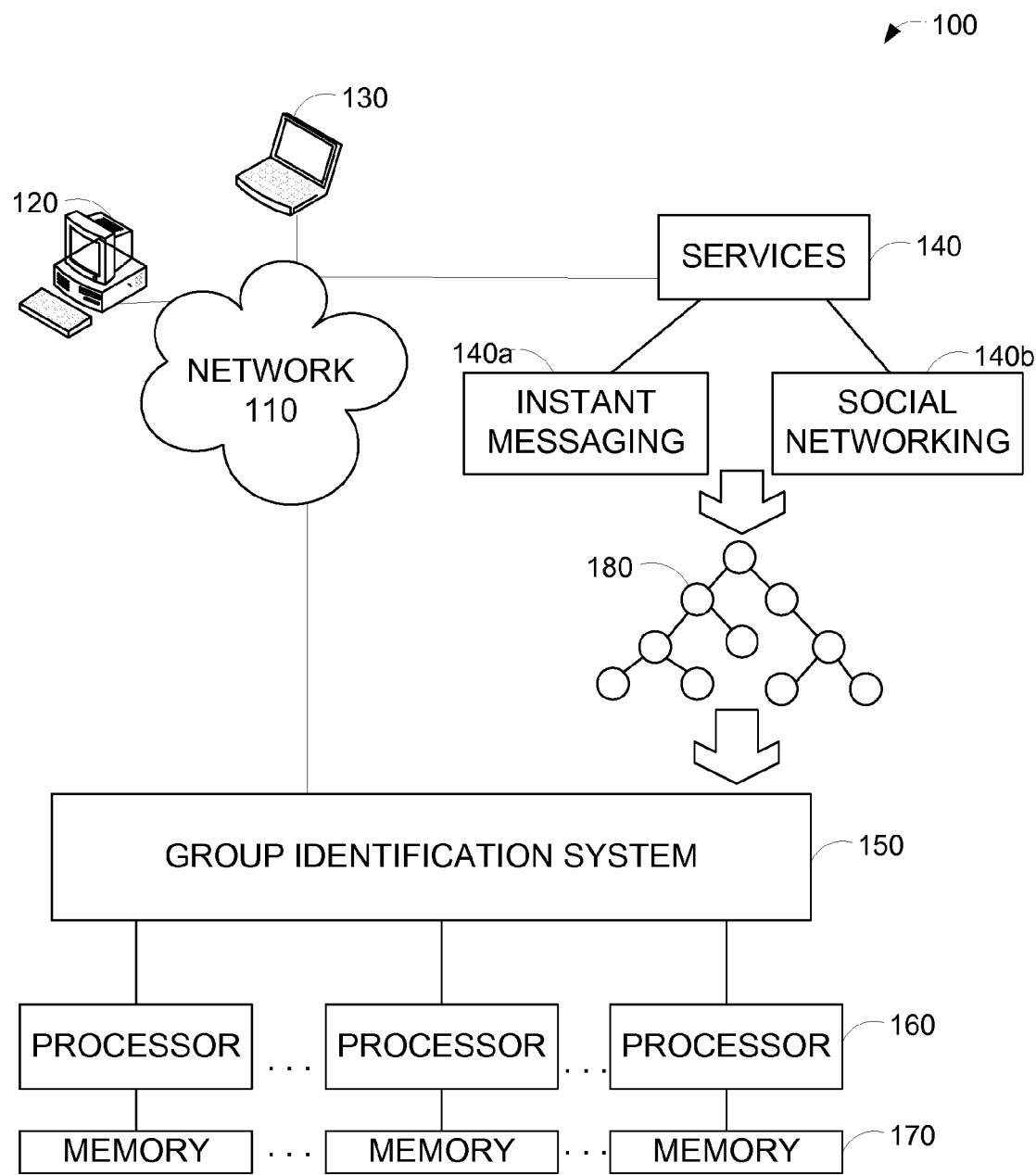
FIG. 1 is a network diagram that illustrates an exemplary operating environment, according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the invention efficiently identify groups in large-scale networks having a plurality of edges and nodes. The large-scale networks are split into smaller parts by splitting the edges into fractions. Any node which has at least one connection with another node may be in at least one fraction. For each fraction, a similarity metric between a pair of nodes is calculated by determining the number of neighbors which the pair of nodes share. Alternatively, the similarity metric may be a ratio that includes data about a total number of neighbors that the pair of nodes share compared to the total number of neighbors that the pair of nodes does not share. In yet another embodiment, the similarity metric is a ratio of the neighbors that the pair of nodes have in common to the pair of nodes' combined total neighbors. Each of the above-described similarity metrics may be utilized to generate a hierarchical clustering for the fractions. In an embodiment, hierarchical clustering for each fraction includes merging the pairs of nodes that satisfy the similarity metric to generate merged nodes. In turn, the merged nodes provide a set of neighbors that is a union of the of the neighbors of each node in the pair and in-link edges that is a union of the in-link edges of either node in the pair of nodes. After clustering has occurred within each fraction, the resulting subnetworks having merged nodes merged nodes and corresponding edges are gathered together and new fractions are formed. The new fractions are re-clustered to form new subnetworks. In an embodiment, the recursive fractionation and clustering of the large-scale network is repeated until a specified number of clusters is attained or mergers between the clusters or nodes is not possible. Accordingly, embodiments of the present invention generates clusters from the large-scale networks, where the clusters identify groups that may share a specified number of neighbors.

As utilized throughout the description, the term "component" refers to firmware, software, hardware, or any combination of the above.

FIG. 1 is a block diagram that illustrates an exemplary computing environment 100, according to embodiments of the invention. The computing environment 100 is not intended to suggest any limitation as to scope or functionality. Embodiments of the invention are operable with numerous other special purpose computing environments or configurations. With reference to FIG. 1, the computing environment 100 includes a communication network 110, client devices 120 and 130, services 140, group identification system 150, processors 160, memory 170 and large-scale networks 180.

The large-scale network 180 is a collection of nodes and edges. The edges represent relationships between the nodes connected by the edges. The nodes may represent entities, such as schools, persons, places, etc. In certain embodiments, the large scale network is generated by mining the Internet for relationships between entities.

In an embodiment, services 140 may provide data that is utilized to generate the large-scale network 180. The services 140 may include, but are not limited to, instant messaging and social network services 140a and 140b. The instant messaging service 140a include lists that specify the relationships among entities on the instant messaging networks. Similarly, the social networking services provides web pages that specify relationships among entities on the social networking networks. Accordingly, the web pages and lists associated with instant messaging and social networking services 140a and 140b are utilized to generate the large-scale network 180.

The client devices 120 and 130 may include personal computers, personal digital assistants, laptops and mobile phones. The client devices 120 and 130 may utilize the services 140 to share multimedia and communicate with client devices in the social networking and instant messaging networks. Additionally, the client devices 120 and 130 may communicate with other client devices that are outside of the social networking and instant messaging networks. Moreover, a group identification to system 150 may be queried by the client device 120 and 130 to locate other clients that share a collection of neighbors that represent employees, friends, family, associates, etc.

In an embodiment of the present invention, the group identification system 150 clusters hundreds of millions of nodes with billions of edges in manageable time. The group identification system 150 cluster the large-scale network 180 by splitting the edges into fractions, merging similar nodes in each fraction, gathering the resulting networks into new fractions and iterating until a desired number of clusters is realized or until mergers are not feasible. Accordingly, the group identification system 150 produces a hierarchical clustering of the nodes.

In some embodiments, the group identification system 150 includes a multi-processing environment having processors 160 and memory 170. The processors 160 are utilized to fraction the network and generate the clusters as indicated above. The number of processors 160 may determine the number of fractions, and the size of the memory 170 associated with each processor may determine the number of nodes or edges that are stored in each fraction. The multi-processing environment increases efficiency by enabling parallel clustering and fractionation. In an embodiment, the processors 160 and memory 170 are distributed across a network, such as the Internet, and may include client devices.

The communication network 110 may include a wireless or wired networks. The client devices 120 and 130 communicate with the services 140 and group identification system 150 via the communication network 110. In some embodiments, the client devices 120 and 130 generate queries for relationships between individuals or corporations, and the queries are transmitted and processed by the group identification system 150.

Accordingly, embodiments of the present invention leverage efficiencies inherent in large-scale social networks such as cliques or social circles to identify groups and to respond to queries to present the identified groups and associated characteristics, such as sex, affiliations, business information, contact information, etc.

A group identification system may include a fractionation component, a clustering component and a presentation component. The group identification system receives large scale networks and utilizes the fractionation and clustering components to identify the groups within the large-scale network. Furthermore, the presentation component is utilized to process queries and provide results or information associated with the groups included in the large-scale networks.

Figure 2:
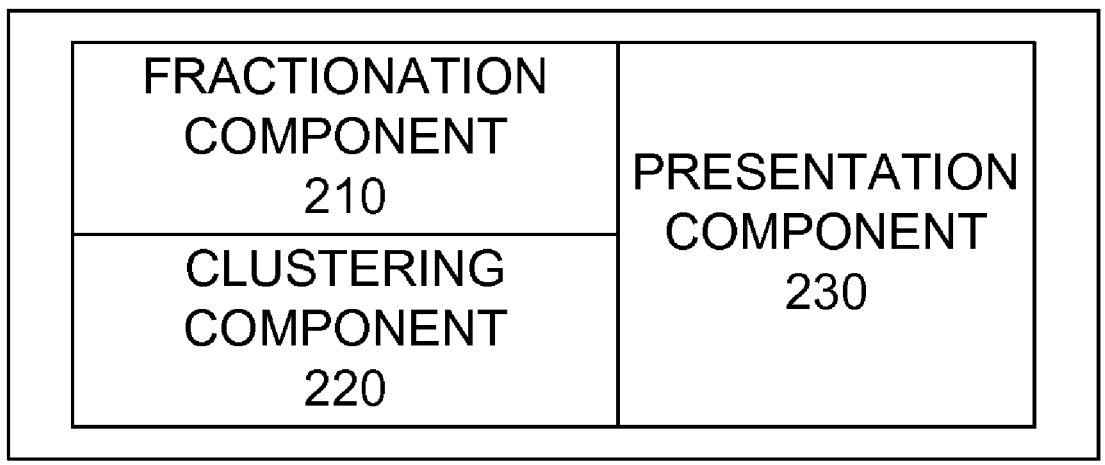
FIG. 2 is a block diagram that illustrates an exemplary group identification system, according to embodiments of the present invention.

FIG. 2 is a block diagram that illustrates an exemplary group identification system 200, according to embodiments of the present invention. The group identification system 200 includes a fractionation component 210, a clustering component 220 and a presentation component 230.

The fractionation component 210 splits the large-scale network or subnetworks generated during previous iterations into fractions. In turn, the clustering component 220 receives the fractions and clusters the edges or nodes associated with each fraction based on a similarity metric. When the number of clusters in each subnetworks is large after an iteration of fractionation and clustering or mergers are possible., the clusters are gathered, re-fractioned and re-clustered. Accordingly, embodiments of the present invention provides re-fractionation of the large-scale networks by utilizing the clusters from a previous iteration to define the fractions of a subsequent iteration.

The similarity measure for the clustering component 220 requires updates to in-link edges and clusters associated with merged nodes clusters when two clusters or nodes are merged. To provide the updatability for the associated edges, the entire large-scale network is made available to the clustering component 220 throughout the clustering process. When the large-scale networks does not fit into memory, fractionation and clustering enables a close estimation of the connections between nodes to be iteratively loaded into memory to perform the necessary merges among nodes in the large-scale networks.

In an embodiment, memory constraints provide a threshold that dictates the size of a fraction. In other words, the size of the fraction is tied to the memory size. Additionally, because the entire large-scale network is not loaded into memory at once, the fractionation of the large-scale networks introduces some uncertainty. However, a level of uncertainty may be tolerated to achieve an approximate identification of the pertinent groups in the large-scale networks. Furthermore, the level of uncertainty introduced by fractionation produces parallel processing abilities which may justify a tradeoff in accuracy in favor of increases in efficiency, i.e., speed.

The fractionation component 210 may split the clusters defining subnetworks of the large-scale network or the large scale network based on nodes in a fraction or edges in a fraction.

When the fractionation component 210 splits the nodes of a group of clusters or large-scale hierarchical network into fractions, associated edge information must be stored in memory to calculate the similarity among the nodes in each fraction during the clustering phase, which is performed by the clustering component 220. In some embodiments, the fractionation component 210 ignores the edges that connect to nodes that are outside of the fraction. Moreover, the list of neighbors associated with each nodes is also stored. Alternatively, all edges associated with nodes in each fraction are stored. When the fractionation component 210 processes subnetworks having clusters, a count of edges within each cluster and all edges between clusters are stored to enable the clustering component 220 to calculate the similarity metric on clusters in the subnetworks. In some embodiment, the number of nodes stored in memory is limited by the associated edge information for each fraction that must be stored into memory.

Alternatively, when the fractionation component 210 splits edges associated with a group of clusters or a large-scale hierarchical network into fractions the edge information is stored in memory to enable clustering by the clustering component 220. Splitting by edge may generate fractions having a cluster or node in more than one fraction. Accordingly, the clustering component 220 may leverage fractions that share a cluster or node and initially merge all nodes or clusters among fractions that contain the same nodes. In an embodiment, the clustering component 220 efficiently merges all nodes with a common node because nodes that occur in more than one fraction can be merged with two different nodes during the various iterations In another embodiment, hierarchical clustering utilized a similarity metric to merge nodes and generate clusters. Alternatively, a distance metric that is derived from the similarity metric may be utilized to generate the clusters. In an embodiment, the similarity between a group of nodes is measured by a number of triangles. A triangle is a set of three nodes which are all connected to each other. Thus, for a given pair of nodes that are connected to each other, the number of triangles which the pair of nodes are both a part of is simply the number of shared neighbors. In other words, the similarity metric measures the number of paths of length 2 from one node to the other. Accordingly, the merging of nodes in the large-scale network may be based on a social principle that if a node belongs to a cluster or clique, then nodes that represent close friends or neighbors are more likely to be friends or neighbors with each other.

In an embodiment of the present invention, the similarity metric between a pair of nodes or cluster n1, n2 is the weight of the link between them plus one-half times the number of neighbors which they have in common. The similarity metric, $\omega(n1, n2)$, between nodes or clusters n1 and n2 is $$\omega(n1, n2) = w_{n1} w_{n2} + \frac{P_2}{2},$$

where $P_2$ is the number of paths of length two between the two nodes or clusters n1 and n2, $w_{n1}$ is the weight of a first node or cluster, and $w_{n2}$ is the weight of a second node or cluster. In an embodiment, the weight of a node or cluster is a count of the number of nodes. For each fraction, nodes or clusters that satisfy the similarity metric are merged while other nodes are not merged. The merged nodes in each fraction are utilized to form a plurality of clusters for the large-scale network. In some embodiments, the clusters are fractioned and re-clustered to obtain refined results that better capture group dynamics associated with the large-scale networks. Accordingly, the fractionation and clustering is recursively applied until merging is no longer possible among any collection of clusters or a specified number of clusters is realized.

In some embodiments, efficiency is increased, during each iteration, when un-clustered nodes which have a value of $\omega(n1, n2)$ of at least two with another node (clustered or un-clustered) in each fraction are merged. Generally, the un-clustered nodes are merged with their most similar neighbor because it is likely that un-clustered nodes would be clustered with the other node during a later iteration of the recursive fractionation and clustering.

Additionally, for each fraction having clusters, the clustering component 220 provides a stopping criteria that indicates when not to merge two clusters which have edges between them. The clustering component 220 does not merge two clusters n1, n2 if $\omega(n1, n2)$ is less than a specified percentage, ζ % of the minimum of the number of edges within the two clusters. For instance, the stopping criteria would prevent a merge between nodes when the similarity metric $\omega(n1, n2) \leq \zeta \min(|n1|, |n2|)$, where ζ is a specified percentage, such as 50%, |n1| and |n2| are counts of the number of edges of the clusters, n1 and n2. Accordingly, when deciding to merge clusters, the clustering component 220 utilizes the stopping criteria to measure the size of each cluster as compared to the number of nodes each cluster has in common.

In some embodiments, the clustering component 220 stops all merging among nodes or clusters when the maximum value of $\omega(n1, n2)$ for clusters or nodes which can be merged is less than one or when nodes or clusters cannot be merged. In an alternate embodiment, the clustering component stops when all clusters associated with each fraction can be placed into memory or when a number of edges for all clusters can fit into memory. After the fractionation and clustering components provide the clusters that identify groups included in the large-scale network, client devices may query or view the clusters to obtain information about the entities included in the clusters.

The presentation component 230 provides the client with a display that presents the information about the entities. The presentation component 230 may receive queries and process the queries to extract the information associated with entities specified in the query from the groups represented by the clusters.

A recursive hierarchical clustering technique that efficiently process large-scale networks fractions the large-scale networks into subnetworks and clusters the fractions recursively based on specified similarity metrics and stopping criteria. In certain embodiments, the hierarchical clustering techniques utilize multi-processing environments to increase efficiency associated with identifying groups in the large-scale networks.

Figure 3:
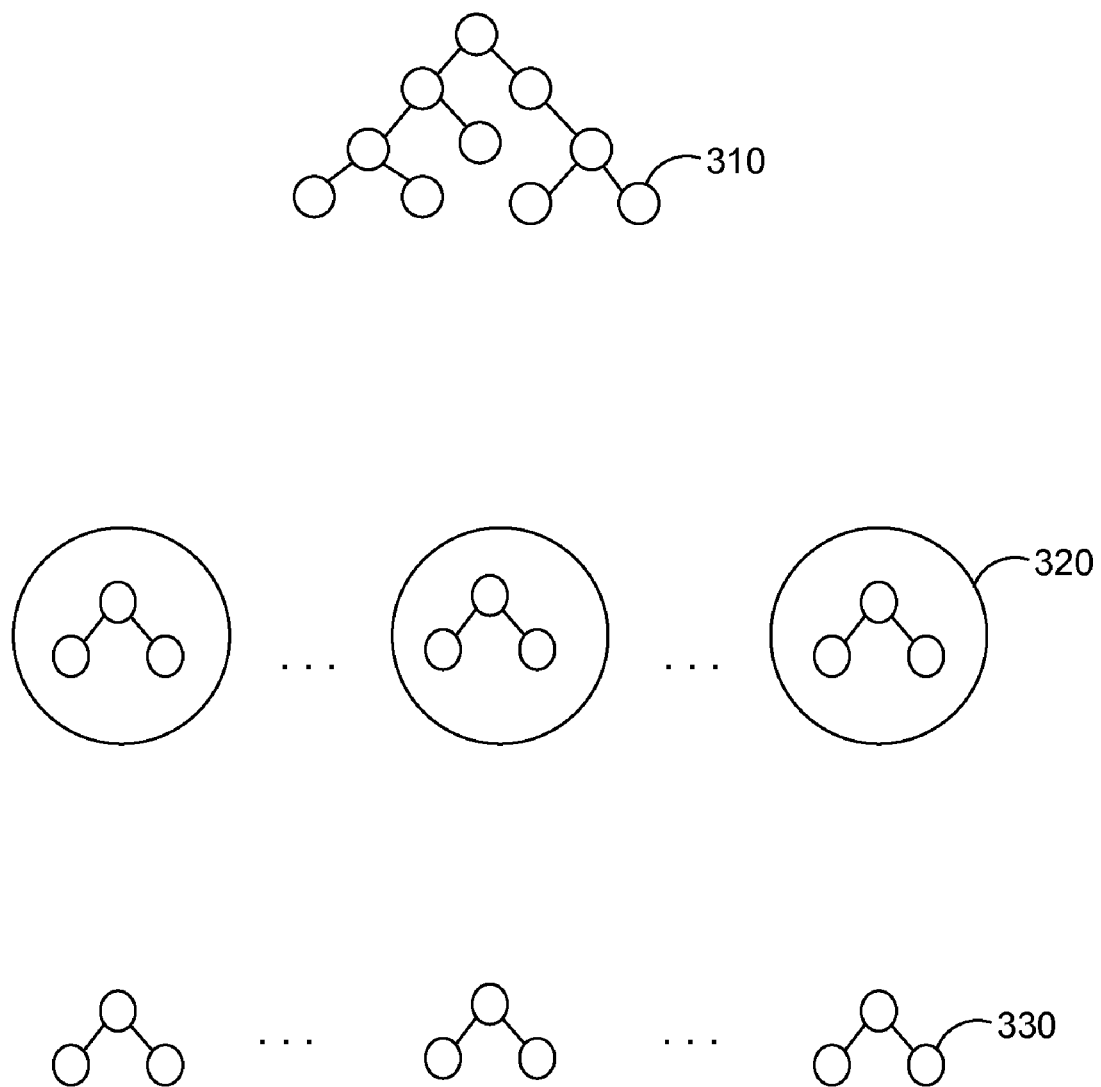
FIG. 3 is tree diagram that illustrates an exemplary hierarchical clustering technique, according to embodiments of the present invention.

FIG. 3 is a tree diagram that illustrates an exemplary hierarchical clustering technique, according to embodiments of the present invention. The hierarchical clustering technique includes a fractionation and clustering phase. During the fractionation phase a large-scale network 310 is split into fractions 320. Each fraction 320 includes a specified number of nodes or edges that may be constrained on a memory threshold. For instance, when the large-scale network 310 includes two million edges it may be impractical to load the large-scale network 310 and perform the group identification procedures when the memory constraints allow only one hundred thousand edges. Thus, with a memory constraint of one hundred thousand edges it is possible to split the large-scale network 310 into twenty fractions 320 having one hundred thousand edges. Each of the fractions 320 may be simultaneously loaded into a multi-processing system having twenty processors and a first iteration of the hierarchical clustering technique may be employed on the edges of each fraction.

During the recursive hierarchical clustering technique the stopping criteria may specify that fractionation and clustering stops when each fraction 320 is reduced to five thousand edges. This stopping criteria enables all twenty fractions 320 to be loaded into memory having an edge threshold of one hundred thousand edges. The final set of clusters that satisfy the stopping criteria are processed to identify the groups in the large-scale network. In one embodiment, the groups are identified by a cluster identifier that is utilized to mark each node included in a cluster.

A recursive hierarchical clustering techniques enables the group identification system to efficiently identify distinct groups in a large-scale network. The group identification system utilizes fractionation and clustering components to identify groups in the large-scale networks.

Figure 4:
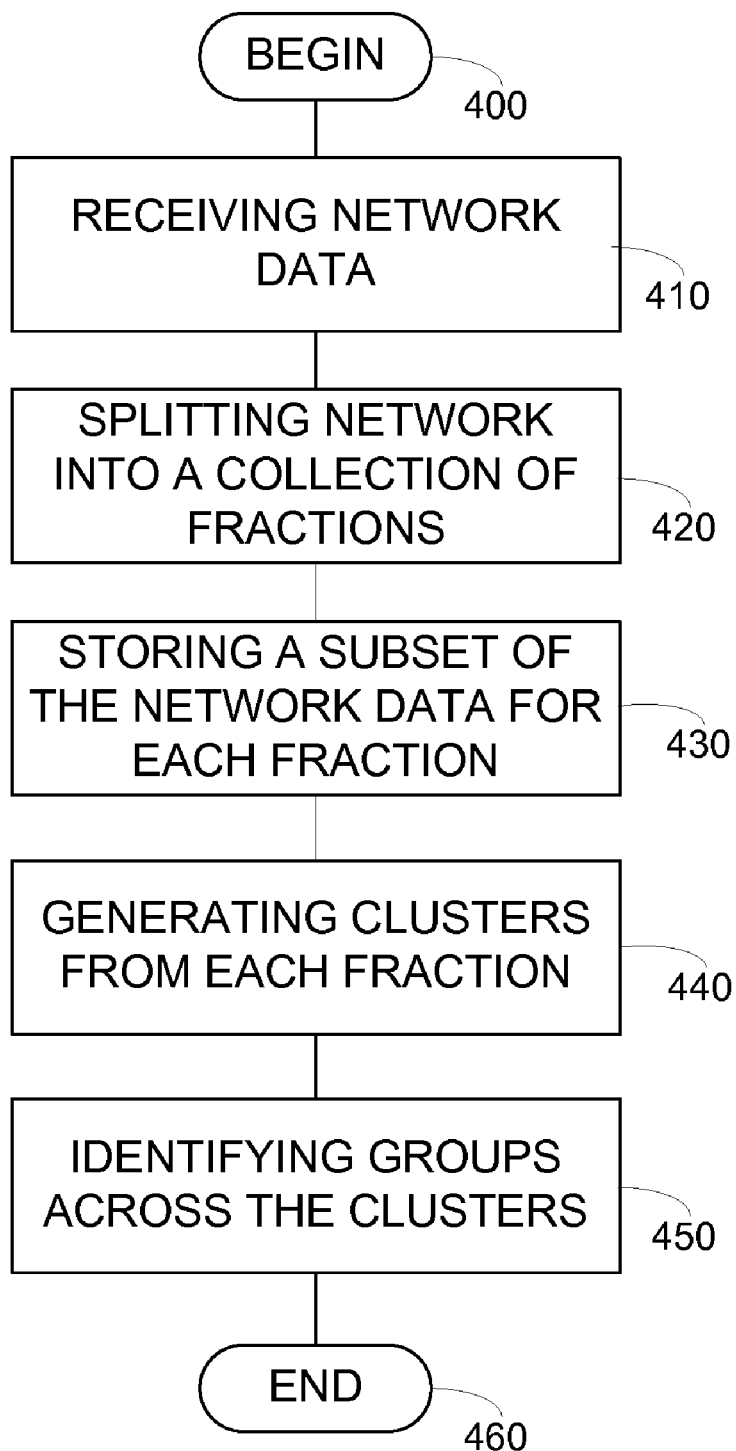
FIG. 4 is a logic diagram that illustrates an exemplary method to identify groups in large-scale networks, according to embodiments of the present invention.

FIG. 4 is a logic diagram that illustrates an exemplary method to identify groups in large-scale networks.

The method begins in step 400. In step 410, large-scale network data is received by the group identification system. The large-scale network data may include edge data or node data that describes the relationship among entities represented by the nodes. In turn, the large-scale network data is split into a collection of fractions based on a memory constraint or edge threshold, in step 420. One or more subsets of the large-scale network data associated with each fraction is stored, in step 430. Clusters are generated from the collection of fractions by utilizing a similarity metric, in step 440. The group identification system may utilize the similarity metric and the stored one or more subsets of the large-scale network data to determine whether to merge un-clustered nodes or clusters. The clusters generated from the large-scale network are recursively fractionated to generate new clusters until a specified stopping criteria is satisfied. After the stopping criteria is satisfied, the group identification system identifies groups across the new clusters, in step 450. The method terminates in step 460.

In sum, a group identification system utilizes a recursive hierarchical clustering technique to identify groups in a large-scale network. The large scale networks includes edges and nodes that are utilized by the group identification system to split the network in a collection of fractions. In turn, edge information associated with each fraction is utilized to determine when a merge is possible based on a specified similarity metric and when to stop the recursive hierarchical clustering if a stopping criteria is satisfied. Accordingly, clusters generated from the large-scale network are utilized to represent distinct groups.

The foregoing descriptions of the invention are illustrative, and modifications in configuration and implementation will occur to persons skilled in the art. For instance, while the present invention has generally been described with relation to FIGS. 1-4, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A computer-implemented method to identify groups in large networks, the method comprising:
   receiving a plurality of edges associated with the large networks;
   splitting the plurality of edges into a collection of fractions;
   generating, while refractioning and reclustering, one or more clusters from each fraction in the collection of fractions based on a similarity metric, wherein the similarity metric, $\omega(n1, n2)$, between nodes or clusters $n1$ and $n2$ is $$\omega(n1, n2) = w_{n1} w_{n2} + \frac{P_2}{2},$$

wherein $P_2$ is the number of paths of length two between the two nodes or cluster $n1$ and $n2$, $w_{n1}$ is the weight of a first node or cluster, $w_{n2}$ is the weight of a second node or cluster, and the weight is a count of the nodes in $n1$ or $n2$; and
   identifying a set of groups across the one or more clusters having nodes corresponding to a subset of the plurality of edges associated with the large networks.

2. The computer-implemented method of claim 1, wherein the large network is based on web pages associated with a social network service.

3. The computer-implemented method of claim 1, wherein the large network is based on contact lists utilized by a messaging service.

4. The computer-implemented method of claim 1, further comprising for each fraction, merging un-clustered nodes that share a specified number of neighbors.

5. The computer-implemented method of claim 1, further comprising for each fraction, merging un-clustered nodes that satisfy the similarity metric.

6. The computer-implemented method of claim 1, wherein a number of edges associated with each fraction of the collection of fractions is based on a memory threshold.

7. The computer-implemented method of claim 6, further comprising storing the number of edges associated with each fraction.

8. The computer-implemented method of claim 1, further comprising merging said one or more clusters that share one or more nodes.

9. The computer-implemented method of claim 8, wherein said merging includes merging two clusters having one or more edges between them and satisfying the similarity metric.

10. A computer system to identify groups in large networks, the system comprising:
    a fractionation component that is configured to receive a plurality of edges associated with the large networks and to split the plurality of edges into a collection of fractions;
    a clustering component is configured to receive the collection of fractions and to generate, while refractioning and reclustering, one or more nodes or clusters from each fraction in the collection of fractions based on a similarity metric, wherein the similarity metric, $\omega(n1, n2)$, between nodes or clusters $n1$ and $n2$ is $$\omega(n1, n2) = w_{n1} w_{n2} + \frac{P_2}{2},$$

wherein $P_2$ is the number of paths of length two between the two nodes or cluster $n1$ and $n2$, $w_{n1}$ is the weight of a first node or cluster, $w_{n2}$ is the weight of a second node or cluster, and the weight is the number of nodes in $n1$ or $n2$; and
    the cluster component is configured to identify a set of groups across the one or more clusters having nodes corresponding to a subset of the plurality of edges associated with the large networks.

11. The computer system of claim 10, wherein the clustering component is configured to form said one or more clusters by merging nodes that share a selected number of neighbors.

12. The computer system of claim 10, wherein the large network is based on web pages associated with a social network service.

13. The computer system of claim 10, wherein the large network is based on contact lists utilized by a messaging service.

14. The computer system of claim 10, wherein the clustering component is configured to merge, for each fraction, un-clustered nodes that share a specified number of neighbors.

15. The computer system of claim 10, wherein the clustering component is configured to merge, for each fraction, un-clustered nodes that satisfy the similarity metric.

16. The computer system of claim 10, wherein a number of edges associated with each fraction of the collection of fractions is based on a memory threshold.

17. The computer system of claim 16, wherein the number of edges associated with each fraction is stored in memory.

18. The computer system of claim 10, wherein the clustering component is configured to merge said one or more clusters that share one or more nodes.

19. The computer system of claim 18, wherein merging said one or more clusters that share one or more nodes includes merging two clusters having one or more edges between them and satisfying the similarity metric.

20. A computer system having multiple processors and memories configured to identify groups in large networks, a number of available processors among multiple processors determines a number of fractions supported by the computer system and the available memory associated with each available processor determines a number of edges or nodes stored in each of the fractions, the system further comprising:

a fractionation component that is configured to receive a plurality of edges associated with the large networks and to split the plurality of edges into a collection of fractions;

a clustering component is configured to receive the collection of fractions and to generate, while refractioning and reclustering, one or more nodes or clusters from each fraction in the collection of fractions based on a similarity metric, wherein the similarity metric, $\omega(n1, n2)$, between nodes or clusters n1 and n2 is $$\omega(n1, n2) = w_{n1} w_{n2} + \frac{P_2}{2},$$

wherein $P_2$ is the number of paths of length two between the two nodes or cluster n1 and n2, $w_{n1}$ is the weight of a first node or cluster, $w_{n2}$ is the weight of a second node or cluster, and the weight is the number of nodes in n1 or n2; and the cluster component is configured to identify a set of groups across the one or more clusters having nodes corresponding to a subset of the plurality of edges associated with the large networks.

* * * * *